(12) United States Patent
Moore et al.

(10) Patent No.: US 8,726,296 B1
(45) Date of Patent: May 13, 2014

(54) SOURCE-INDEPENDENT EVENT COLLECTION AND FLATTENING

(75) Inventors: Kim Nga Thi Moore, Irvine, CA (US); Igor Belilovets, Irvine, CA (US); Ilie O. Grigore, Irvine, CA (US); Sachan Madahar, Cerritos, CA (US); Daniel P. Grieves, San Juan Capistrano, CA (US)

(73) Assignee: Google Inc., Mountain View, CA (US)

( * ) Notice: Subject to any disclaimer, the term of this patent is extended or adjusted under 35 U.S.C. 154(b) by 215 days.

(21) Appl. No.: 13/193,406

(22) Filed: Jul. 28, 2011

(51) Int. Cl.
   *G06F 3/00* (2006.01)
(52) U.S. Cl.
   USPC ............................................ 719/318; 709/201
(58) Field of Classification Search
   USPC ......................................................... 719/318
   See application file for complete search history.

(56) References Cited

U.S. PATENT DOCUMENTS

| | | | | |
|---|---|---|---|---|
| 6,208,345 | B1 * | 3/2001 | Sheard et al. | 715/853 |
| 7,111,076 | B2 * | 9/2006 | Abjanic et al. | 709/246 |
| 2005/0262194 | A1 * | 11/2005 | Mamou et al. | 709/203 |
| 2006/0015880 | A1 * | 1/2006 | Kouznetsov et al. | 719/318 |
| 2007/0168874 | A1 * | 7/2007 | Kloeffer et al. | 715/764 |
| 2009/0228430 | A1 * | 9/2009 | Berger et al. | 707/2 |
| 2011/0055214 | A1 * | 3/2011 | Mui et al. | 707/737 |
| 2012/0102118 | A1 * | 4/2012 | Arms et al. | 709/205 |
| 2013/0006968 | A1 * | 1/2013 | Gusmini et al. | 707/722 |

\* cited by examiner

*Primary Examiner* — Emerson Puente
*Assistant Examiner* — Charlie Sun
(74) *Attorney, Agent, or Firm* — Foley and Lardner LLP; John D. Lanza

(57) ABSTRACT

A system and machine-implemented method relating to event processing including receiving from a first system first event data describing a first user initiated event occurring on the first system and converted from a first data format to a second data format, receiving from a second system second event data describing a second user initiated event occurring on the second system and converted from a third data format to the second data format, associating a first view component which processes at least one of event data and dimension data to generate a report with event data received from the first system, and invoking the first view component in response to receiving the first event data to generate a report for an end user.

10 Claims, 4 Drawing Sheets

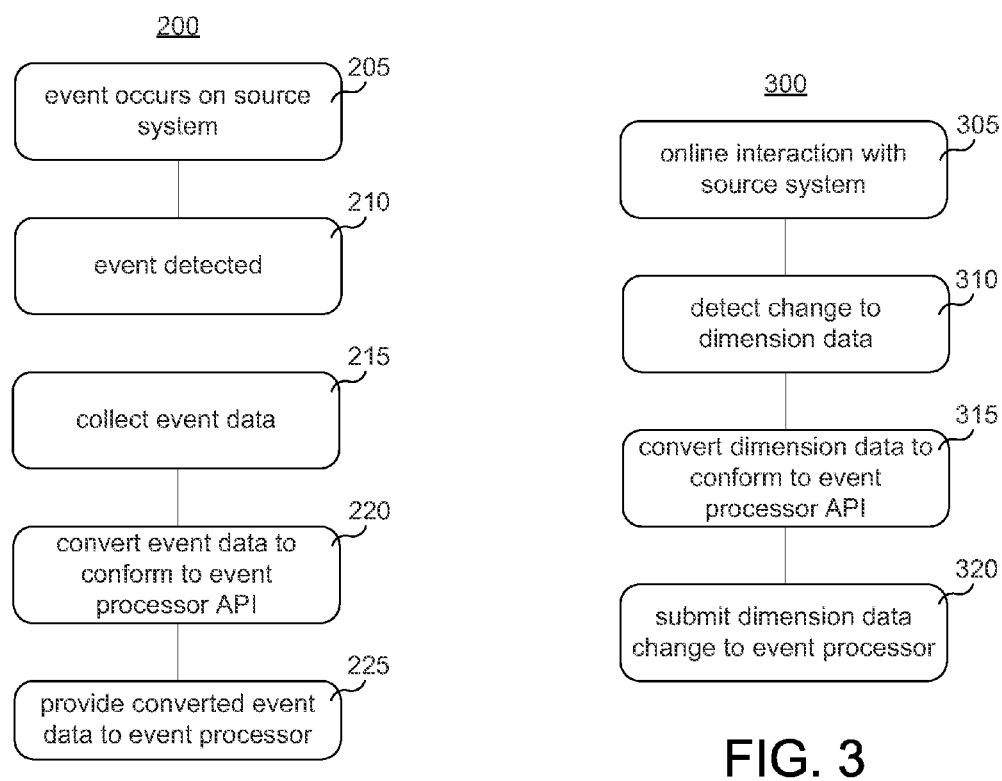

SOURCE-INDEPENDENT EVENT COLLECTION AND FLATTENING

BACKGROUND

In a high-volume online service environment, there is a need to identify, track, and process events that occur in the course of providing various services or features. Often, these events are generated in response to user interaction with a service. As it is typical for millions of such events to be generated each day, these events are automatically generated, collected, and processed by computer systems. These events are typically processed periodically to generate reports for end users useful for assessing the status of and managing the provided online services.

Data associated with these events is divided into two categories: dimension data and event data. An example of dimension data is an advertiser record, in which multiple items (or "dimensions") of data are stored, such as an advertiser identifier, name, address, and contact information. This example of dimension data comprises information about an advertiser that initiates an event. Another example is a webpage record, which stores items such as URL, last modification date, and identification of the party that last modified the webpage. This example of dimension data comprises information about a resource, such as a webpage, that is utilized as part of a transaction that generates an event. Although a request or transaction from a user may trigger an event that generates event data, the event and its event data are separate from the request or transaction that triggers the event. An example of event data is a record, often in a log file, which indicates (1) a time at which (2) a particular advertiser visited (3) a particular webpage. Generally, a piece of dimensional data is commonly associated with multiple events; for example, multiple events corresponding to multiple visits by different parties to a single webpage. Additionally, an event may be associated with multiple pieces of dimension data, as in the above example of event data, which may be associated with a dimension data record relating to the advertiser, and another dimension data record relating to the visited webpage. To reduce the amount of storage required, event data is usually normalized: a process by which information unique to an individual event is stored separately from corresponding dimension data. A normalized event data record will make reference to a corresponding dimension data record, typically by use of a unique identifier assigned to the dimension data record (e.g., an advertiser identifier or a webpage identifier).

In a large customer service operation, there are many discrete sources of event and dimensional data. Each of these sources is typically developed separately, and they each have different internal formats for data corresponding to events. For example, a web server may generate a log file regarding information it has served. Conventionally, a system for aggregating events occurring on these sources would periodically retrieve event data from the sources, and use particularized software both for retrieving event data and transforming the retrieved event data into reports. Conventionally, for each source for event and dimension data a dedicated pipeline has been created which collects and forwards event and dimension data, translates the event and dimension data, and then generates reports based on the event and dimension data. Collecting such data typically demands highly customized code for interaction with the applications and/or products which provide such data. Translation and report generation based on the collected data is typically customized based on the format of the collected data and the reports to be generated. Thus, creating a pipeline for each source of event and dimension data demands specialized, and accordingly limited, developer resources, which limits the rate at which new sources can be incorporated into a reporting infrastructure and the rate at which new reports which make use of data provided by these sources can be produced.

SUMMARY

The disclosed subject matter relates to a machine-implemented method for event processing including receiving from a first system, at an event processor, first event data, the first event data comprising information describing a first user initiated event occurring on the first system when the first system provides a service or a feature, the first event data converted from a first data format used by the first system to a second data format; receiving from a second system, at the event processor, second event data, the second event data comprising information describing a second user initiated event occurring on the second system when the second system provides a service or a feature, the second event data converted from a third data format used by the second system to the second data format; associating a first view component, which processes at least one of event data and dimension data to generate a report, with event data received from the first system; and invoking the first view component in response to receiving the first event data to generate a report based on the first event data and the second event data for an end user.

The disclosed subject matter further relates to a system for processing event information, the system including an event processor configured to receive converted event data, the converted event data comprising information describing a user initiated event occurring on a system when the system provides a service or a feature, in a first data format and process the converted event data for reporting to an end user; a first event plugin configured to receive first event data, the first event data comprising information describing a first user initiated event occurring on a first system when the first system provides a service or a feature, in a second data format from the first system, convert the first event data to the first data format, and submit the converted first event data to the event processor; and a second event plugin configured to receive second event data, the second event data comprising information describing a first user initiated event occurring on a second system when the second system provides a service or a feature, in a third data format from the second system, convert the second event data to the first data format, and submit the converted second event data to the event processor; wherein the event processor is configured to associate a first view component, which processes at least one of event data and dimension data to generate a report, with event data received from the first system, and invoke the first view component to generate a report for an end user in response to receiving of the converted first event data.

The disclosed subject matter also relates to a machine-readable medium comprising instructions stored therein, which when executed by a machine, cause the machine to perform operations including receiving from a first system, at an event processor, first event data, the first event data comprising information describing a first user initiated event occurring on the first system when the first system provides a service or a feature, the first event data converted from a first data format used by the first system to a second data format; receiving from the first system, at the event processor, information describing a change to first dimension data associated with the first event data; receiving from a second system, at the event processor, second event data, the second event data comprising information describing a second user initiated event occurring on the second system when the second system provides a service or a feature, the second event data converted from a third data format used by the second system to the second data format; associating a first view component, which processes at least one of event data and dimension data to generate a report, with event data received from the first system; invoking the first view component in response to the receiving of the first event data to generate a first report based on the first event data and the second event data; associating a second view component, which processes at least one of event data and dimension data to generate a report, with the first dimension data; and invoking the second view component in response to the receiving of the information describing the change to the first dimension data to generate a second report based on the first dimension data.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The novel features of the subject technology are set forth in the appended claims. However, for purpose of explanation, several embodiments of the subject technology are set forth in the following figures.

FIG. 2 illustrates an exemplary process 200 illustrating event plugin 107 processing event data received from event data source 106.

FIG. 3 illustrates an exemplary process 200 illustrating event plugin 112 processing dimension data received from dimension data source 111.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Figure 1:
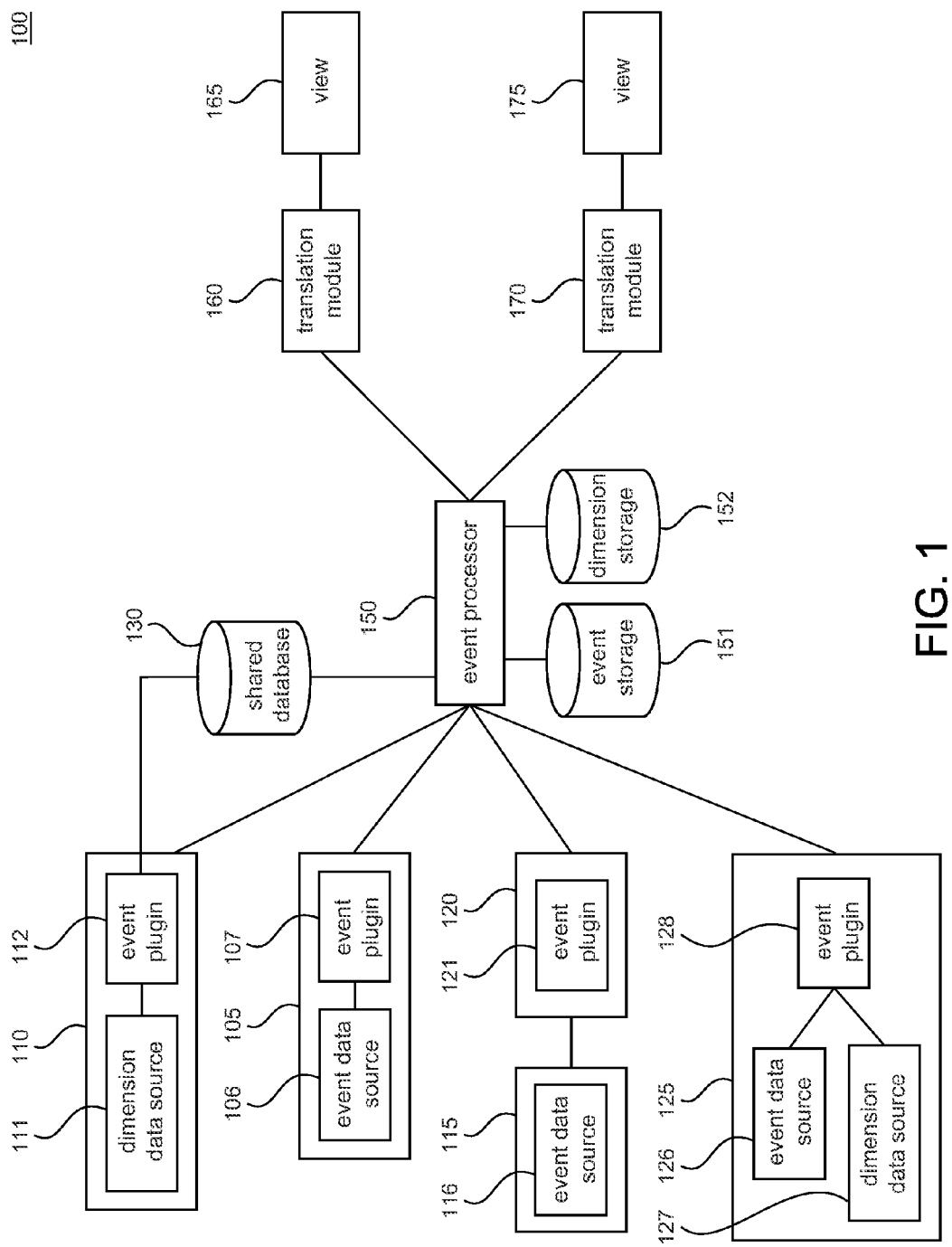
FIG. 1 illustrates an exemplary architecture diagram for event collection and processing.

FIG. 1 illustrates an exemplary architecture diagram for event collection and processing. Event processor 150 provides an interface for the submission of events and dimensional data to event processor 150. Events and dimensional data are submitted to event processor 150 in accordance with the defined interface, which ensures that such data is presented in a common format, thereby reducing the need for event processor 150 to translate event or dimension data into an internal format useful for internal handling by event processor 150. Techniques for submitting such data to event processor 150 are well known in the art, and include, but are not limited to, various remote procedure call (RPC) and inter-process communication (IPC) techniques allowing for communication between separate networked systems, separate processors in a single system, or separate processes within a single system. In some embodiments, interfaces are provided that allow multiple programming languages and environments to submit events and dimension data to event processor 150, thereby making the facilities provided by event processor 150 more readily available to various event and dimension data sources.

Source systems 105, 110, 115, and 125 each generate event or dimension data as a result of interaction with a user of the respective system. Source systems 105, 115, and 125 each generate event data. Source systems 110 and 125 each generate dimension data. As illustrated in FIG. 1, source system 125 generates both event and dimension data. Source systems 105, 110, 115, and 125 each illustrate different architectures for generating the event and dimension data provided to event processor 150. These architectures are discussed in more detail below, but those skilled in the art will appreciate that other architectures are consistent with the subject matter of this disclosure.

Source system 105 includes an event data source 106, which is responsible for generating event data of interest. Typically, the event data generated by event data source 106 is in a format useful for internal use by event data source 106. In one example, event data source 106 may include a web server component which stores information regarding information retrieved via the web server component in a text-based log file. Generally, each product or application has a unique set of interfaces and data formats for obtaining the generated event data. Event plugin 107 determines when event data source 106 has generated event data, which may be for one or more events. Event plugin 107 then communicates with event data source 106 to obtain event data, although there may be other data of interest elsewhere in source system 105, in order to prepare event data of interest for event processor 150. In some embodiments, event plugin 107 will periodically poll or scan for new event data; in other embodiments, event plugin 107 is notified by event data source 106 when new event data is available. Event plugin 107 converts event data from the internal format in which it is obtained from event data source 106 to a format required by the interface provided by event processor 150, and then submits the event data to event processor 150. Although event data source 106 and event plugin 107 may be separate software components or programs executing on source system 105, the functionality described herein for event data source 106 and event plugin 107 may also be incorporated into a single software component or program.

Source system 110 includes dimension data source 111, which generates new and/or modified dimension data, in contrast to the event data generated by event data source 106 in source system 105. Event plugin 112 determines when dimension data of interest for event processor 150 has changed, converts the dimension data to the format required by the interface provided by event processor 150, and submits the dimension data to event processor 150. As will be seen throughout this description, the term "event plugin" is not limited to components which submit event data to event processor 150, but also includes components which submit event data and/or dimension data to event processor 150. Via the interface provided by event processor 150, event plugin 112 notifies event processor 150 of new dimension data (insert), changes to existing dimension data (change), or the removal of existing dimension data (delete). Additionally, in some embodiments event plugin 112 also specifies a time range, with a start and optional end, representing the effective date of the change in dimension data. In some embodiments, the interface provided by event processor 150 allows event plugin 112 to indicate a bulk change in dimension data, specifying changes to multiple dimension data items at once. In some embodiments, event plugin 112 and event processor 150 make use of a shared database 130. In such embodiments, dimension data is stored by event plugin 112 into the database 130, and event plugin 112 simply notifies event processor 150, by reference, of a change or changes to the dimension data recorded in the database 130. By not transmitting the dimension data directly from the system to event processor 150, network bandwidth is reduced, and event processor 150 can avoid or defer handling the dimension data itself. In such embodiments, either dimension data source 111 or event plugin 112 may be responsible for storing the dimension data in the common database. Although the dimension data is stored in the database 130 in a format that complies with the interface defined by event processor 150, additional dimension data components not used by event processor 150 may be stored in database 130 as well.

In some embodiments, event processor 150 may request event plugin 112 to retrieve dimension data from dimension data source 111. By this mechanism, instead of, or in addition to, event plugin 112 pushing changes in dimension data to event processor 150, event processor 150 may request current values of the dimension data. This mechanism may be used where periodic polling of dimension data is used instead of event plugin 112 pushing changes to event processor 150, where event processor 150 wishes to ensure it has the current dimension data, or in response to an asynchronous request by a user of event processor 150 for the dimension data. Generally, however, when a new event or change to dimension data occurs it is preferred for event plugins 107 and 112 to be configured to "push" data to event processor 150, as this allows for event processor 150 to more dynamically react to events and dimension data changes as they occur.

Source system 115 and system 120 illustrate an alternative architecture in which event plugin 121 executes on a separate system from event data source 116. In some embodiments, event plugin 121 may execute on event processor 150. In some embodiments, event plugin 121 executing on event processor 150 is configured to periodically retrieve, or "poll" for, new event data. In other embodiments, event plugin 121 may also obtain event data from an additional source system (not illustrated), such that it accumulates event data from a plurality of source systems. Similarly, a dimensional data source and a respective event plugin may execute on separate systems.

Source system 125 generates both event data, via event data source 126, and dimension data, via dimension data source 127. As illustrated in FIG. 1, event plugin 128 handles data generated by both event data source and dimension data source 127. In some embodiments, event data source 126 and dimension data source 127 are implemented by a single component, which simultaneously generates an event data and a corresponding dimension data. As illustrated by systems 115 and 120, in some embodiments event plugin 128 may execute on a system other than source system 125. Also, in some embodiments, event data source 126, dimension data source 127, and plugin event 128 may each execute on separate systems.

In some embodiments, event plugin 107 may be configured to submit each event individually to event processor 150 as soon as event plugin 107 determines a new event has been generated by event data source 106. With event plugin 107 configured in this manner, event processor 150 is continually notified of new events as they arise from event data source 106. Accordingly, event processor 150 is able to provide immediate analysis of event activity, and also react quickly to event activity. For example, as discussed in more detail below, event processor 150 may invoke view component 165, which in turn generates and issues a report to an individual responsible for managing source system 105.

In another embodiment, event plugin 107 is configured to periodically collect events from event data source 106, process them, and supply events to event processor 150. For example, event plugin 107 may periodically process entries recorded in a log file generated by event data source 106. In another example, event plugin 107 may wait until a predetermined number of event data items have been generated by event data source 106 before supplying the events to event processor 150. In some embodiments, event plugin 107 may distinguish between various event data items generated by event data source 106, and perform different handling based upon the characteristics of each event data item. For example, there may be a set of high priority event data items which demand more immediate submission to event processor 150. The manner in which event plugin 107 is configured to process event data is often a function of how the event data is generated by event data source 106, as different products and applications will have various ways to capture events.

FIG. 2 illustrates an exemplary process 200 illustrating event plugin 107 processing event data received from event data source 106. At step 205, an event occurs as a result of online interaction with source system 105. Event plugin 107 is configured to, by a mechanism effective with the process by which event data source 106 generates events, detect when an event has occurred at step 210. At step 215, plugin 107 collects data associated with the event from event data source 106. In some embodiments, event plugin 107 will associate a time or time range (with a start and optional end) with the event. This event data is typically in an internal format unique to event data source 106. At step 220, event plugin 107 converts the collected event data into a format acceptable for submission to event processor 150, as defined by the interface provided by event processor 150 for the purpose of submitting events. At step 225, event plugin 107 submits the converted event data to event processor 150.

FIG. 3 illustrates an exemplary process 200 illustrating event plugin 112 processing dimension data received from dimension data source 111. At step 305, a change occurs to dimension data (e.g., adding, modifying, or deleting dimension data) due to online interaction with source system 110. At step 310, event plugin 112 detects that the dimension data has changed. In some embodiments, event plugin 112 will associate a time or time range (with a start and optional end) with the change. At step 315, event plugin 112 converts the dimension data into a format acceptable for submission to event processor 150, as defined by the interface provided by event processor 150 for the purpose of submitting dimension data. In some embodiments, event plugin 112 will, as discussed previously, store the dimension data in shared database 130 in a format acceptable for submission to event processor 150. At step 320, event plugin 112 submits the change to the dimension data to event processor 150.

As discussed above, event processor 150 receives event and dimension data submissions via a defined interface, which imposes particular formatting for submitted events and dimension data. Thus, by way of example, event plugin 107 converts event data received from event data source 106 from a first internal data format into the event format defined by the interface for submitting events to event processor 150; and event plugin 121 converts event data received from event data source 116 from a second internal data format into the event format defined by the interface for submitting events to event processor 150—the same event format into which event plugin 107 converted its event data. Also, by way of example, event plugin 112 converts dimension data received from dimension data source 111 into the dimension data format defined by the interface for submitting dimension data to event processor 150, and event plugin 128 converts dimension data received from dimension data source 127 into the dimension data format defined by the interface for submitting dimension data to event processor 150—the same dimension data format into which event plugin 112 converted its dimension data. In some embodiments, the interface for event processor 150 may accept event data in a plurality of different formats. In some embodiments, the interface for event processor 150 may accept dimension data in a plurality of different formats.

Figure 4:
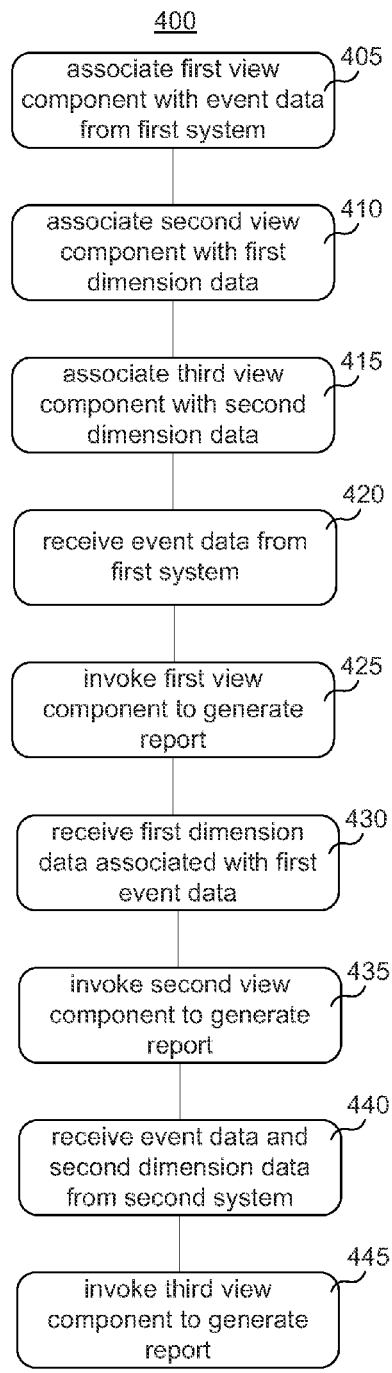
FIG. 4 illustrates an exemplary process 400 illustrating event processor 150 processing event data and dimension data submitted via the interface for event processor 150.

FIG. 4 illustrates an exemplary process 400 illustrating event processor 150 processing event data and dimension data submitted via the interface for event processor 150. In step 405, event processor 150 associates a first view component, such as view component 165, with first event data received from first source system 105. In step 410, event processor 150 associates a second view component, such as view component 175, with first dimension data associated with the first event data. In step 415, event processor 150 associates a third view component, such as view component 175, with second dimension data associated with second event data received from second source system 125. In each of steps 405, 410, and 415, more than one view component may be associated with particular types of event data or dimension data.

In step 420, event processor 150 receives first event data from first source system 105 via event plugin 107. In some aspects of the disclosed subject matter, the received event data is stored in event storage 151 for use in later processing. Typically the event data includes a time of occurrence for the event. In some aspects of the disclosed subject matter, normalization of the event data, whereby information unique to an event occurrence is separated from dimension data common to multiple events, may be performed prior to storage, with the event data recorded in event storage 151, and any separated dimension data stored in a dimension data storage, such as shared database 130.

Event processor 150 reviews the received first event data to determine whether a view component associated with the first event data, such as the first view component associated in step 405, should be invoked due to the event data being significant with respect to the view component. For some event data, a single event may be significant enough for an associated view component to be invoked. For other event data, the receipt of at least a threshold volume of events may cause an associated view component to be invoked. For other event data, the receipt of event data may not trigger invocation of an associated view component, such as a case where only daily or weekly reports are generated by an associated view component. In some embodiments, an associated view component may be registered with event processor 150 as being interested in consuming particular event data, or event data submitted by a particular event plugin, event data source, or source system. In such aspects, when event data is received by event processor 150, an associated view component may be executed to evaluate whether that view component should be invoked in view of the receipt of the event data.

In step 425, the first view component is invoked to generate a report based on the first event data and the second event data, when event processor 150 determines the view component should be invoked in response to receipt of the first event data received in step 420. In some aspects of the disclosed subject matter, invocation of view component 165 is performed by invoking translation module 160, which in turn, after converting data received from event processor 150 to a format expected by view component 165, invokes view component 165 to generate one or more reports. Event processor 150 provides interfaces by which view component 165 may obtain event data stored by event processor 150, obtain dimension data via event processor 150, and, in some embodiments, retrieve current dimension data from dimension data source 111 via event plugin 112. This is discussed in further detail below with respect to FIG. 5.

In step 430, event processor 150 receives information describing a change in first dimension data associated with the first event data, from first source system 110 via event plugin 112. In some aspects of the disclosed subject matter, the received dimension data change is stored in dimension storage 152 for later processing. However, in some aspects of the disclosed subject matter, the dimension data is retained elsewhere, such as shared database 130, and the change received in step 430 is not stored by event processor 150.

Event processor 150 reviews the received dimension data change to determine whether an associated view component should be invoked due to the dimension data change being significant with respect to the view component. For some dimension data, a single change may be significant enough for an associated view component to be invoked. For other dimension data, the receipt of at least a threshold volume of changes may cause an associated view component to be invoked. For other dimension data, the receipt of a dimension data change may not trigger invocation of an associated view component, such as a case where daily or weekly reports are generated by the view component, or a case in which event data activity—not changes in dimension data, triggers invocation of an associated view component. In some aspects of the disclosed subject matter, an associated view component may be registered with event processor 150 as being interested in consuming particular dimension data, or dimension data submitted by a particular event plugin, dimension data source, or source system. In such aspects, when dimension data changes are received by event processor 150, an associated view component may be executed to evaluate whether the view component should be invoked in view of the receipt of the dimension data change.

In step 435, the second view component of step 410 is invoked to generate one or more reports when event processor 150 determines the view component should be invoked in response to receipt of the first dimension data received in step 430. In some aspects of the disclosed subject matter, invocation of view component 175 is performed by invoking translation module 170, which in turn, after converting data received from event processor 150, invokes view component 175 to generate one or more reports. Event processor 150 provides interfaces by which view component 175 may obtain event data stored by event processor 150, obtain dimension data via event processor 150, and, in some aspects of the disclosed subject mutter, retrieve current dimension data from dimension data source 111 via event plugin 112. This is discussed in further detail below with respect to FIG. 5.

In step 440, event processor 150 receives second event data and a change for second dimension data associated with the second event data. Much as described above with respect to steps 430 and 435, event processor 150 reviews the received second event data and change to the second dimension data to determine if an associated view component should be invoked. In step 445, the third view component of step 415 is invoked to generate one or more reports, when event processor 150 determines the third view component should be invoked in response to receipt of the second dimension data received in step 440. In some aspects of the disclosed subject matter, event processor 150 determines the third view component should be invoked in response to the second event data received in step 440.

Event processor 150 provides an additional interface used by translation modules 160 and 170 and view components 165 and 175, which allows them to access event and dimension data stored and tracked by event processor 150. Regarding event data, the interface allows for selectively accessing event data. For example, events may be selectively retrieved based on the time of the events, the source of the events, or some field associated with the events. Regarding dimension data, the interface allows for selectively accessing recorded changes to dimension data and the dimension data with its current values. In some embodiments, the interface also allows retrieving the dimension data with the values it had at a specified time, either by retrieving stored snapshots of the dimension data, or deriving the values of the dimension data based on information recorded by event processor 150 with respect to changes made to the dimension data submitted by event plugins.

Translation module 160 communicates with event processor 150 and view component 165. Translation module 160 receives and/or retrieves event and dimension data from event processor 150, and converts it into a more useful format for view component 165, which generates one or more reports based on the converted data. For example, event processor 150 stores event data and dimension data in a highly normalized format in order to minimize storage requirements for such data. Translation module 160 denormalizes the highly normalized data, which flattens the data into a format more accessible or useable by view component 165. In some embodiments, a view component may not require an intermediate translation module, but instead communicates with event processor 150 directly. In some embodiments, upon receiving and evaluating event or dimension data, event processor 150 will push the data to translation module 160, which in turn invokes view component 165 to generate a report. In other embodiments, view component 175 may be invoked by a user in order to generate a report, which in turn causes translation module 170 to pull data from event processor 150.

View component 165 generates one or more reports based on event and dimension data available through event processor 150 and converted by translation module 160. In some embodiments, view component 165 is invoked dynamically by event processor 150 in response to event processor 150 receiving event or dimension data. Often, such dynamically generated reports are sent via a notification such as a text message or email to one or more persons interested in accessing the underlying events. For example, an unexpectedly high volume of events may indicate a problem with a system or need to allocate additional resources to respond to the events. In some embodiments, view component 165 may be periodically invoked, such as for generating daily or weekly reports based on event activity. In some embodiments, view component 165 may be invoked in response to a user request for a particular report.

Figure 5:
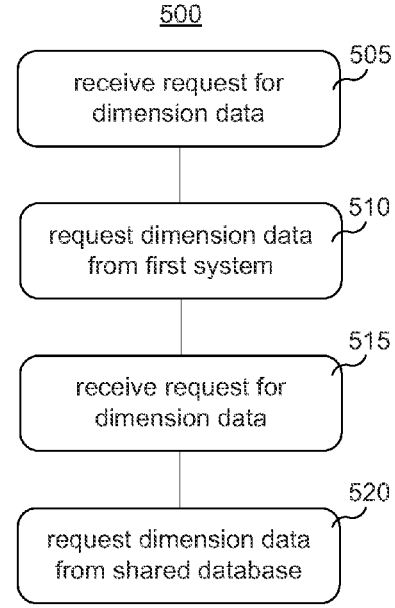
FIG. 5 illustrates an exemplary process 500 in which event processor 150 receives requests for dimension data not stored by event processor 150.

FIG. 5 illustrates an exemplary process 500 in which event processor 150 receives requests for dimension data not stored by event processor 150. Such requests may be issued by view component 165 or translation module 160. In step 505, event processor 150 receives a first request for dimension data, issued by view component 165, for example. In this case, event processor determines that the requested dimension data may be obtained from source system 110 via event plugin 112. In step 510, event processor 150 issues a request via event plugin 112 to obtain the dimension data requested in step 505. In some aspects of the disclosed subject matter, event plugin 112 may convert the dimension data before providing it to event processor 150. Once this information is obtained by event processor 150, event processor 150 provides the requested dimension data to view component 165.

In step 515, event processor 150 receives a second request for dimension data, issued by view component 175, for example. In this case, event processor determines that the requested dimension data may be obtained from shared database 130. In step 520, event processor 150 issues a request to shared database 130 for the requested dimension data. Once this information is obtained by event processor 150, event processor 150 provides the requested dimension data to view component 165.

In some aspects of the disclosed subject matter, event processor 150 validates that event plugin 112 is the owner or an authorized modifier for submitted changes to dimension data. If this validation fails, a submitted change is rejected. In some embodiments, event processor 150 validates accesses of dimension data through the interface provided for translation modules 160 and 170, to ensure that a component or user of the component is permitted to read particular event or dimension data. If this validation fails, the data will not be made available to the component.

In some embodiments, event plugin 112 registers itself with event processor 150, indicating which dimension data is generated or modified by event plugin 112. In some embodiments, view component 165 registers itself with event processor 150, indicating which dimension data is used by view component 165 to generate reports. These registrations allow event processor 150 to generate dependency graphs of dimension data sources in order to determine when view component 165 should be invoked based upon changes in dimension data. Additionally, in an instance where event processor 150 seeks to request current dimension data, it may make use of event plugin registrations in order to determine which event plugin to issue a request to for the dimension data.

Dimension data records, event data records, and other information accumulated by the techniques described by this disclosure may comprise advertiser or user data that is considered private by the advertiser or user. In an aspect of the disclosed subject matter, such records or information are anonymized and not connected with user names. Advertisers or users may opt out of the collection of such data. Advertisers or users also may review collected data and remove or modify particular data. Security procedures, such as limiting access to stored information to specified accounts, may be used to restrict access to such information to authorized users or systems.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software inventions can be implemented as sub-parts of a larger program while remaining distinct software inventions. In some implementations, multiple software inventions can also be implemented as separate programs. Finally, any combination of separate programs that together implement a software invention described here is within the scope of the invention. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 6:
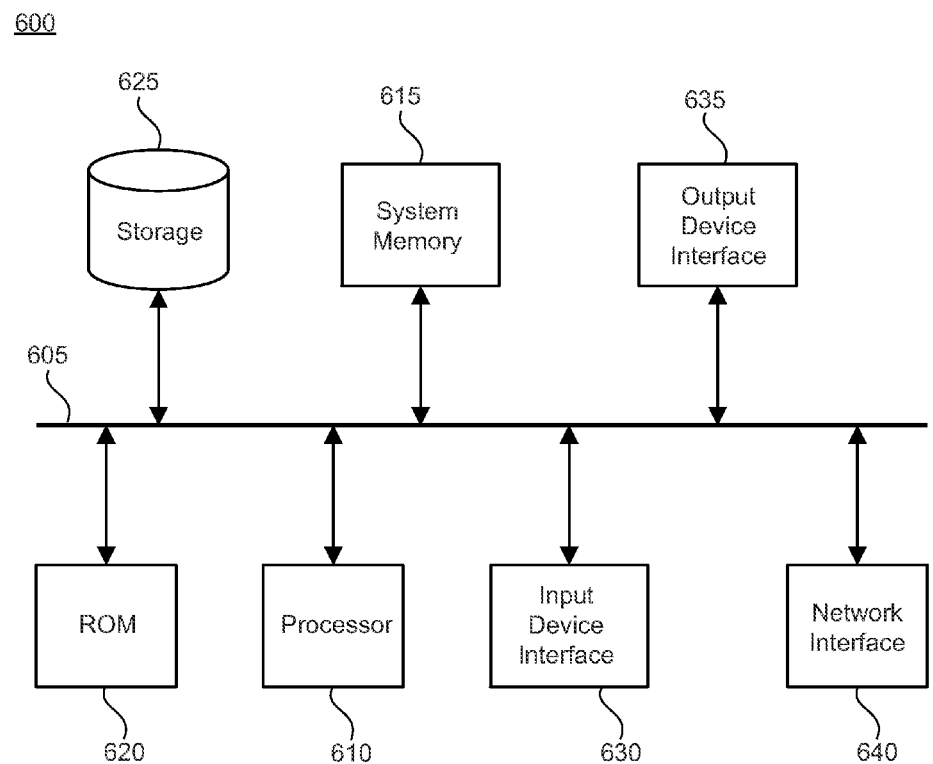
FIG. 6 conceptually illustrates an electronic system 600 with which some implementations of the subject technology are implemented

FIG. 6 conceptually illustrates an electronic system 600 with which some implementations of the subject technology are implemented. The electronic system 600 can be a computer, phone, PDA, or any other sort of electronic device. Such an electronic system includes various types of computer readable media and interfaces for various other types of computer readable media. Electronic system 600 includes a bus 605, processing unit(s) 610, a system memory 615, a read-only memory 620, a permanent storage device 625, input devices 630, output devices 635, and a network 640.

The bus 605 collectively represents all system, peripheral, and chipset buses that communicatively connect the numerous internal devices of the electronic system 600. For instance, the bus 605 communicatively connects the processing unit(s) 610 with the read-only 620, the system memory 615, and the permanent storage device 625.

From these various memory units, the processing unit(s) 610 retrieves instructions to execute and data to process in order to execute the processes of the invention. The processing unit(s) can be a single processor or a multi-core processor in different implementations.

The read-only-memory (ROM) 620 stores static data and instructions that are needed by the processing unit(s) 610 and other modules of the electronic system. The permanent storage device 625, on the other hand, is a read-and-write memory device. This device is a non-volatile memory unit that stores instructions and data even when the electronic system 600 is off. Some implementations of the invention use a mass-storage device (such as a magnetic or optical disk and its corresponding disk drive) as the permanent storage device 625.

Other implementations use a removable storage device (such as a floppy disk, flash drive, and its corresponding disk drive) as the permanent storage device 625. Like the permanent storage device 625, the system memory 615 is a read-and-write memory device. However, unlike storage device 625, the system memory 615 is a volatile read-and-write memory, such a random access memory. The system memory 615 stores some of the instructions and data that the processor needs at runtime. In some implementations, the invention's processes are stored in the system memory 615, the permanent storage device 625, and/or the read-only memory 620. For example, the various memory units include instructions for processing multimedia items in accordance with some implementations. From these various memory units, the processing unit(s) 610 retrieves instructions to execute and data to process in order to execute the processes of some implementations.

The bus 605 also connects to the input and output devices 630 and 635. The input devices enable the user to communicate information and select commands to the electronic system. The input devices 630 include alphanumeric keyboards and pointing devices (also called "cursor control devices"). The output devices 635 display images generated by the electronic system 600. The output devices 635 include printers and display devices, such as cathode ray tubes (CRT) or liquid crystal displays (LCD). Some implementations include devices such as a touchscreen that functions as both input and output devices.

Finally, as shown in FIG. 6, bus 605 also couples electronic system 600 to a network 640 through a network adapter (not shown). In this manner, the computer can be a part of a network of computers (such as a local area network ("LAN"), a wide area network ("WAN"), or an Intranet, or a network of networks, such as the Internet. Any or all components of electronic system 600 can be used in conjunction with the invention.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD- RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A machine-implemented method for event processing comprising:
receiving from a first event plugin in a first system, at an event processor, a first event data, the first event data comprising information describing a first user initiated event occurring on the first system when the first system provides a service or a feature, the first event data converted at the first event plugin from a first data format used by the first system to a second data format;

receiving from a second event plugin in a second system, at the event processor, a second event data, the second event data comprising information describing a second user initiated event occurring on the second system when the second system provides a service or a feature, the second event data converted at the second event plugin from a third data format used by the second system to the second data format;

receiving from the first event plugin in the first system, at the event processor, information describing a change to a first dimension data associated with the first event data;

associating a first view component, which processes at least one of different event data and different dimension data with the first event data;

associating a second view component, which processes at least one of different event data and different dimension data, with the first dimension data;

determining that the first event data corresponds to at least one of a predetermined event, and a threshold volume of events;

invoking the first view component in response to the determination, to generate a first report based on the first event data and the second event data for an end user;

invoking the second view component in response to receiving the information describing the change to the first dimension data to generate a second report based on the first dimension data; and generating dependency graphs of dimension data sources in order to determine when at least one of the first view component and the second view component should be invoked based upon changes in the first dimension data.

2. The method of claim 1, further comprising:
receiving from the second event plugin in the second system, at the event processor, information describing a change to second dimension data associated with the second event data;

associating a third view component, which processes at least one of event data and dimension data, with the second dimension data; and invoking the third view component in response to receiving the information describing the change to the second dimension data to generate a third report based on the second dimension data; and wherein generating dependency graphs comprises
generating dependency graphs of dimension data sources in order to determine when at least one of the first view component, the second view component, and the third view component should be invoked based upon changes in the first dimension data.

3. The method of claim 2, wherein
the first dimension data comprises information describing a user that initiated the first user initiated event; and
the second dimension data comprises information describing a resource utilized as part of a transaction that generated the second user initiated event.

4. The method of claim 1, further comprising:
requesting the first dimension data from the first system in response to a request received by the event processor from the first view component.

5. The method of claim 1, further comprising:
requesting the first dimension data from a shared database system in response to a request received by the event processor from the second view component.

6. A non-transitory machine-readable medium comprising instructions stored therein, which when executed by a machine, cause the machine to perform operations comprising:

receiving from a first event plugin in a first system, at an event processor, a first event data, the first event data comprising information describing a first user initiated event occurring on the first system when the first system provides a service or a feature, the first event data converted at the first event plugin from a first data format used by the first system to a second data format;

receiving from the first event plugin in the first system, at the event processor, information describing a change to first dimension data associated with the first event data;

receiving from a second event plugin in a second system, at the event processor, a second event data, the second event data comprising information describing a second user initiated event occurring on the second system when the second system provides a service or a feature, the second event data converted at the second event plugin from a third data format used by the second system to the second data format;

associating a first view component, which processes at least one of event data and dimension data with the first event data;

determining that the first event data corresponds to at least one of a predetermined event, and a threshold volume of events;

invoking the first view component in response to the determination, to generate a first report based on the first event data and the second event data for an end user;

associating a second view component, which processes at least one of different event data and different dimension data, with the first dimension data;

invoking the second view component in response to the receiving of the information describing the change to the first dimension data to generate a second report based on the first dimension data; and generating dependency graphs of dimension data sources in order to determine when at least one of the first view component and the second view component should be invoked based upon changes in the first dimension data.

7. The medium of claim 6, the operations further comprising:
receiving from the second event plugin in the second system, at the event processor, information describing a change to a second dimension data associated with the second event data;

associating a third view component, which processes at least one of event data and dimension data, with the second dimension data;

invoking the third view component in response to the receiving of the information describing the change to the second dimension data to generate a third report based on the second dimension data to generate a third report based on the second dimension data; and wherein generating dependency graphs comprises
generating dependency graphs of dimension data sources in order to determine when at least one of the first view component, the second view component, and the third view component should be invoked based upon changes in the first dimension data.

8. The medium of claim 7, wherein
the first dimension data comprises information describing a user that initiated the first user initiated event; and
the second dimension data comprises information describing a resource utilized as part of a transaction that generated the second user initiated event.

9. The medium of claim 6, the operations further comprising:
requesting dimension data from the first system in response to a request received by the event processor from the first view component.

10. The medium of claim 6, the operations further comprising:
requesting the first dimension data from a shared database system in response to a request received by the event processor from the second view component.

* * * * *